United States Patent Office 3,535,205
Patented Oct. 20, 1970

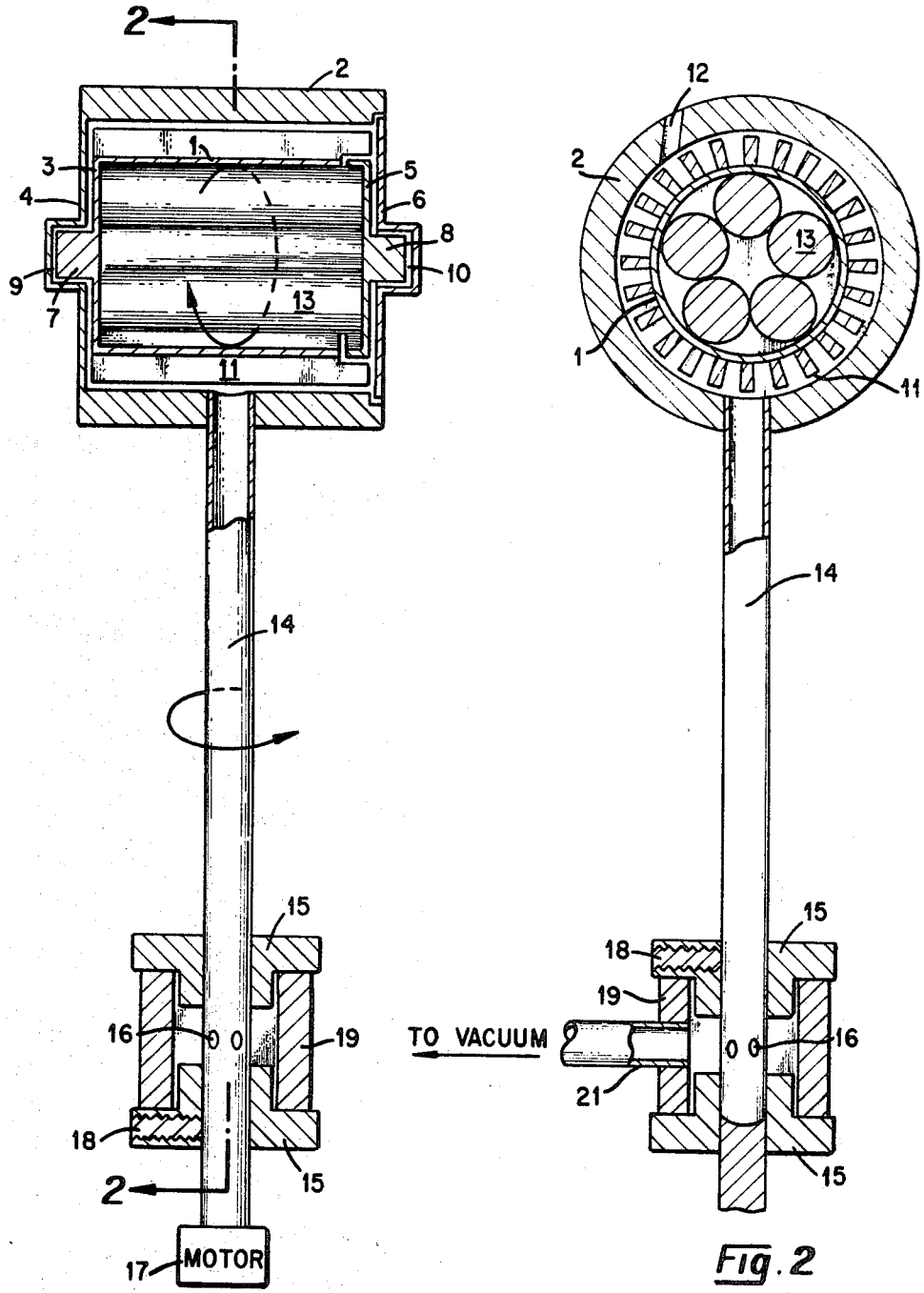

1

3,535,205
METHOD FOR EFFECTING UNIFORM RADIATION OF SAMPLES
Lamont C. Bate, Clinton, and Frank F. Dyer, Knoxville, Tenn., assignors to the United States of America as represented by the United States Atomic Energy Commission
Filed Mar. 21, 1968, Ser. No. 715,080
Int. Cl. G21g 1/00
U.S. Cl. 176—15                                                 7 Claims

ABSTRACT OF THE DISCLOSURE

Samples in a holder are given substantially equal dose in a nonuniform irradiating flux by causing the sample holder to rotate about two perpendicular axes one of which is inclined at about 45° with respect to the direction of the irradiating beam. Rotation of the holder about one of its axes is accomplished by direct mechanical means, and rotation about the other axis is accomplished by a vacuum motor.

BACKGROUND OF THE INVENTION

The invention described herein was made in the course of, or under, a contract with the U.S. Atomic Energy Commission.

Target materials are frequently subjected to bombarding particles for various purposes including activation analysis. The source of the particles may create a general flux or a highly collimated beam depending upon the particular application and apparatus. For example, the neutron source for activation analysis is frequently the flat target plate of a neutron generator. The resultant neutrons therefrom are not collimated. They do have a directional orientation generally symmetrical about the axis of the generator (normal to the target). Therefore, for the purpose of this invention, the term "beam" is used to denote the general directional orientation of the irradiating particles. The direction of the beam is assumed to be aligned with the axis of the generator producing the irradiating particles.

In any irradiating flux, there are spatial and time variations which create difficulties in standardizing the dose to which samples are subjected. This specifically creates a problem of obtaining equal dose when multiple samples are simultaneously irradiated. In order to reduce the effect of these variations upon equalization of dose to each sample, some prior investigators have mounted the samples symmetrically about an axis oriented normal to the irradiating flux. The sample holder is then rotated about this axis. Other investigators, in order to further correct for inhomogeneities in the flux, utilized this same rotating method in combination with reciprocation along the axis of rotation. The first of these methods does not completely solve the problem and the second method is accomplished only with rather complex mechanical equipment, but still does not adequate solve the problem.

The present invention provides a device and a method wherein the above problems are substantially solved such that a plurality of samples, as well as all portions of a single sample, receive a substantially equal dose in an irradiation operation in a manner to be described hereinbelow.

2

SUMMARY OF THE INVENTION

With a knowledge of the limitations of the prior art, as discussed above, it is the object of the present invention to provide a relatively simple device and a method of operation thereof wherein a target material, which may be a plurality of samples, may receive a substantially equal irradiation dose throughout from a source of radiation such that any errors in the activation analysis, for example, of such samples are minimized.

The above object has been accomplished in the present invention by providing a sample holder, adapted to hold a target material, and particularly a plurality of samples, and including means for effecting rotation of the holder about two perpendicular axes with one of such axes being inclined at about 45° with respect to the direction of an irradiating beam which is utilized for irradiation of the target material. In such an arrangement, it has been determined that each portion of the target will receive a substantially equal dose from the irradiating beam during an irradiation cycle, which could not be heretofore achieved with prior art devices or methods.

BRIEF DESCRIPTION OF THE DRAWINGS

FIG. 1 is a showing of a sample holder for accomplishing the above object;

FIG. 2 is a sectional view of FIG. 1 along the line 2—2 thereof; and

DESCRIPTION OF THE PREFERRED EMBODIMENT

Figure 3A:
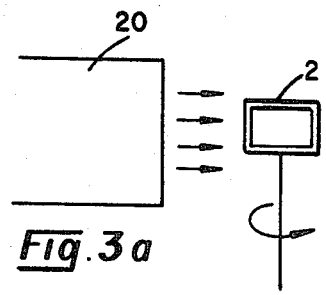
FIGS. 3a, 3b and 3c are schematic showings of possible orientations of the sample holder with respect to a source of irradiation.

Referring to FIG. 1, an inner sample holding cylinder 1 is mounted within an outer cylinder 2. Both of the cylinders are permanently closed with end walls 3, 4, respectively, at one end thereof and are provided with removable covers 5, 6, respectively, at the other end to produce a symmetrically fabricated unit. Corresponding projections 7, 8 and recesses 9, 10 in the cylinder ends and the covers serve as bearings for the inner cylinder 1. Removable cover 6 is held in place by an internal vacuum, described hereinafter. Inner cylinder 1 is provided with a plurality of radially extending vanes 11 that project outward to near the inner surface of cylinder 2, as more clearly shown in FIG. 2. The outer cylinder 2 is provided with an intake port 12 whose axis is approximately tangential to the outer surface of inner cylinder 1. As shown, the inner cylinder 1 accommodates a plurality of samples 13 which may either extend the length of the holder or may be segmented into several samples in each row of the holder. A single sample might also be mounted in the inner cylinder, if desired.

The outer cylinder 2 is permanently mounted on the end of a primarily hollow rotatable shaft 14 with the axis of the cylinder normal to that of the shaft, with the interior of the cylinder communicating with the interior volume of the shaft and with the lower end of said shaft being sealed. A conventional motor 17 is provided for effecting rotation of the shaft 14 about its axis and rotation of the cylinder 2 and its contents about this same axis. The motor 17 is mechanically coupled to the lower end of shaft 14 in a conventional manner.

Positioned around the shaft at a position intermediate the cylinder 2 and the motor 17 is a combined bearing and vacuum seal arrangement which comprises collars 15 attached to shaft 14 by set screws 18 and a sleeve 19 interposed therebetween. A vacuum line 21 is connected to and penetrates sleeve 19 so as to provide communication from the interior volume of the shaft 14 and cylinder 2, through ports 16 in shaft 14, to a vacuum system by means of a vacuum control valve, not shown. It is this vacuum applying means, together with the intake port 12 and the vanes 11, that provides for rotation of the inner cylinder 1 about its own axis which is perpendicular to the axis of rotation of the shaft 14. Furthermore, as described above, the applied vacuum holds cover 6 onto outer cylinder 2. Thus, by rotating the outer cylinder 2 about the axis of shaft 14 and rotating the inner cylinder 1 about its own axis, the samples held in cylinder 1 have three-dimensional movements imparted thereto.

The outer cylinder 2 with its enclosed inner cylinder 1 and the samples 13 are rotated about the axis of shaft 14 at a speed of 60 r.p.m., for example, while at the same time the inner cylinder 1 with its enclosed samples 13 is rotated about its own axis at a speed of at least several hundred r.p.m. by the above-described vacuum system. The speed of the inner cylinder may be controlled, as desired, by the above-mentioned vacuum control valve, not shown. The rotational speed of shaft 14 is controlled by the speed of motor 17, which may be set at any desired value.

Figure 3B:
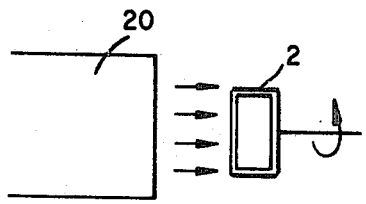
Figure 3C:
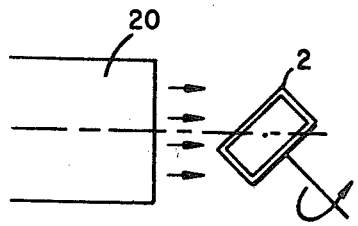

In exposing the samples 13 in the sample holder of FIG. 1 to a nonuniform flux of irradiating particles, which may be from a neutron generator, for example, the position of the holder with respect to the direction of the irradiating particles may assume any one of a plurality of positions. FIGS. 3a, 3b, and 3c illustrate some of these positions, for example. However, it has been determined that there is an optimum position for the holder at which the samples will each receive a substantially equal dose throughout during an irradiation operation, and such a position is shown in FIG. 3c.

The uniformity of the neutron dose from a source 20 to which the samples can be exposed in the sample holder was tested by measuring the $^{18}F$ induced in cylinders ($\frac{1}{4}''$ x $\frac{5}{8}''$) of Teflon and pressed $CaF_2$. Some of the Teflon cylinders were prepared by stacking five disks ($\frac{1}{8}''$ thick by $\frac{1}{4}''$ diameter) punched from Teflon sheet. Each irradiation was made with five cylinders held in place in the sample holder in polyethylene vials. Irradiations were performed with the sample holder positioned in each of the three configurations shown in FIGS. 3a, 3b, and 3c. In each configuration the sample holder center on the axis of the beam was about $1\frac{1}{4}''$ from the end of source 20.

Irradiations were made for about five minutes and radioactivity measurements were begun after a decay period of twenty minutes for Teflon and two hours for $CaF_2$ (to allow decay of $^{44}K$). Measurements were made on each of the total samples and the individual disks to determine the inter-sample precision and the intra-sample variation of activity along each sample. The samples were gross gamma counted in a conventional 2" x 2" NaI(Tl) well detector. Results were normalized to counts per gram at the time counting was begun on the first sample. A half-life of 109.72 minutes was assumed for $^{18}F$. The number of counts collected for each sample ranged between $10^5$ and $3 \times 10^6$ so that the relative standard deviation expected from counting statistics ranged between 0.3 and 0.06 percent.

When the sample holder is positioned and rotated as in FIG. 3a, samples in the ends thereof are periodically located closer to the source than are samples in the center. Since the beam intensity varies inversely as the distance squared, these end samples received a greater dose than the center samples. For example, the middle disks were about 4 percent less radioactive than the end disks. Likewise, when the sample holder and the enclosing cylinder are positioned as shown in FIG. 3b and rotated, the center samples receive a higher dose (about 4% higher) than the end samples due to lower flux away from the centerline of the irradiating beam. However, when the axis of shaft 14 and the sample holding cylinder were inclined at slightly greater than 45° (~50°) with respect to the center of the irradiating beam, all of the samples were found to have received essentially equal neutron doses, which is desired, and thus there is accomplished the above object of the present invention. It should be noted that small variations in rotation rates of either of the cylinders 1, 2 of FIG. 1, when positioned as in FIG. 3c, do not affect the uniformity of the dose received by each of the samples from the irradiation source.

It should be understood that the present invention is not limited for use with a neutron beam as the irradiating source. For example, the source may be X-ray beams, output beams of many accelerators, etc. In all these cases, the beams have certain flux variations which are compensated for with the device of the present invention as utilized in the position shown in FIG. 3c.

This invention has been described by way of illustration rather than limitation and it should be apparent that it is equally applicable in fields other than those described.

What is claimed is:

1. A method of irradiating a target material with a source of particles having a nonuniform irradiating flux such that each portion of said target material will receive an equal dose from said irradiating particles, comprising the steps of rotating an elongated cylindrical holder containing said target material about its axis, simultaneously rotating an elongated cylindrical housing encompassing said holder together with said holder and material about a second axis perpendicular to the axis of said holder, and positioning said housing and its enclosed sample holder adjacent to said source of irradiating particles such that said second axis is oriented at an angle of about 45° with respect to the direction of said irradiating particles, whereby each of said respective rotations will conjointy effect the reception by each portion of said target material of an equal dose from said irradiating particles during an irradiating cycle.

2. The method set forth in claim 1 wherein said sample holder with its contained target material is rotated about its axis at a speed of up to several hundred r.p.m., and said enclosing housing with its contents is rotated about said second axis at a speed of about 60 r.p.m.

3. The method set forth in claim 1, wherein said target material comprises a plurality of samples.

4. An improved device for irradiating a target material with a source of particles having a nonuniform irradiating flux such that each portion of said target material will receive an equal dose, comprising a single, elongated holder for containing said target material, a housing encompassing said holder, means for rotating said sample holder about its axis within said housing, means for simultaneously rotating said housing with its enclosed sample holder about a second axis which is perpendicular to said sample holder axis, and means for positioning said housing in such a manner that said second axis is oriented at an angle of about 45° with respect to the direction of said irradiating particles, whereby each portion of said target material will receive an equal dose from said source during an irradiating cycle.

5. The device set forth in claim 4, wherein said sample holder and said encompassing housing are cylindrical, said holder and said encompassing housing are cylindrical, said nent end walls at one end thereof and with respective removable covers at the other end thereof, said end walls and covers being provided with corresponding projections and recesses in the cylinder ends and the covers which serve as bearings for said sample holder, said sample holder being provided with a plurality of equally spaced, radially extending vanes that project outward to near the inner surface of said encompassing housing, a hollow shaft having one end affixed to said housing and in communication therewith and the other end being sealed, the axis of said shaft being perpendicular to the axis of said sample holder, means for rotating said housing with its enclosed sample holder about said perpendicular axis including motor means coupled in driving relation to said sealed end of said hollow shaft, said encompassing housing being provided with an air intake port having an axis tangential to the outer surface of said sample holder, a bearing and seal arrangement encompassing a portion of said hollow shaft between said housing and the sealed end of said hollow shaft, said hollow shaft being provided with a plurality of openings, said openings providing communication between the interior of said shaft and said housing and the interior of said seal arrangement, and a source of regulated vacuum connected to the interior of said seal arrangement, said means for rotating said sample holder about its axis including said source of vacuum connected to said housing intake port by way of said vanes, said hollow shaft, said openings in said hollow shaft, and the interior of said bearing and seal arrangement.

6. The device set forth in claim 5, wherein said sample holder with its contained target material is adapted to be rotated about its axis at a speed of up to several hundred r.p.m., and said enclosing housing with its contents is adapted to be rotated about said perpendicular axis at a speed of about 60 r.p.m.

7. The device set forth in claim 5, wherein said target material comprises a plurality of samples.

References Cited

UNITED STATES PATENTS

| | | | |
|---|---|---|---|
| 3,006,834 | 10/1961 | Loeb | 176—15 |
| 3,378,448 | 4/1968 | Humphries | 176—15 |
| 3,412,250 | 11/1968 | Arragon et al. | 176—15 X |

BENJAMIN R. PADGETT, Primary Examiner

H. E. BEHREND, Assistant Examiner

U.S. Cl. X.R.

250—52, 106

PO-1050
(5/69)

UNITED STATES PATENT OFFICE
CERTIFICATE OF CORRECTION

Patent No. 3,535,205                           Dated  October 20, 1970

Inventor(s)              Lamont C. Bate et al.

It is certified that error appears in the above-identified patent and that said Letters Patent are hereby corrected as shown below:

Column 1, line 60, "adequate" should read ---adequately---. Column 4, line 37, "conjointy" should read ---conjointly---; line 65 should read ---holder and housing being provided with respective perma- ---.

Signed and sealed this 1st day of June 1971.

(SEAL)
Attest:

EDWARD M. FLETCHER, JR.                WILLIAM E. SCHUYLER, JR.
Attesting Officer                       Commissioner of Patents